United States Patent [19]

Tippetts

[11] 4,313,470

[45] Feb. 2, 1982

[54] FLUIDIC FLOW ARRESTER

[75] Inventor: John R. Tippetts, Sheffield, England

[73] Assignee: United Kingdom Atomic Energy Authority, England

[21] Appl. No.: 68,722

[22] Filed: Aug. 22, 1979

[30] Foreign Application Priority Data

Sep. 5, 1978 [GB] United Kingdom ............... 35669/78

[51] Int. Cl.³ .............................................. F15C 1/14
[52] U.S. Cl. .................................. 137/821; 137/809; 137/810
[58] Field of Search ............... 137/809, 810, 812, 823, 137/825, 13, 821, 803

[56] References Cited

U.S. PATENT DOCUMENTS

| 3,182,674 | 5/1965 | Horton | 137/13 X |
| 3,410,291 | 11/1968 | Boothe et al. | 137/809 |
| 3,448,752 | 6/1969 | O'Neill | 137/835 X |

Primary Examiner—William R. Cline
Attorney, Agent, or Firm—Lowe, King, Price & Becker

[57] ABSTRACT

For achieving a shut-off function, a mainstream communicates with a control stream into which an outlet for the mainstream opens laterally. By reciprocating the control stream back and forth across the outlet, for example by alternate pressurisation of reservoirs to which the control stream is connected at its ends, access of the mainstream to the outlet is inhibited. When the reciprocation is discontinued full flow of the mainstream to or through the outlet can take place.

7 Claims, 2 Drawing Figures

FLUIDIC FLOW ARRESTER

FIELD OF INVENTION

The present invention relates to fluidic flow control by which is meant the control of fluid by means of devices which in themselves do not employ any moving parts.

BACKGROUND OF THE INVENTION

Examples of the devices available for achieving fluidic control are the fluidic diode, the vortex amplifier and the jet pump. Devices such as these, in which no moving parts are employed, may be combined to achieve control functions which customarily are achieved only by the use of mechanically movable valve members. Thus, it is possible to achieve with combinations of fluidic devices the functions of pressure relief and pressure regulation. An object of the present invention is to provide a form of fluidic flow control which will achieve a shut-off function.

According to the present invention, a method of arresting a mainstream flow of fluid comprises placing the mainstream in permanently open communication with a control stream, reciprocating the control stream back and forth across a lateral outlet to inhibit access by the mainstream to the outlet, and discontinuing reciprocation of the control stream when it is required that the arresting function should cease for resumption of full flow of the mainstream to and through the outlet.

A control flow of a reciprocating nature is advantageous in that it can be provided by the interconnection of alternately pressurised reservoirs of the control flow fluid. If instead of being pressurised alternately, these reservoirs become subject to balanced pressures less than that of the mainstream in the region of intercommunication with the control stream, the reciprocation of the control stream is discontinued and a control state established whereby full flow of the mainstream can occur.

In terms of apparatus, the invention provides a fluidic valve device for arresting a mainstream flow of fluid which device comprises a control stream passage, a mainstream inlet and a mainstream outlet both in permanently open communication with the passage but with one of them branched so as to open into that passage at locations disposed symmetrically to either side of a lateral opening of the other into the same passage, means to reciprocate a control stream of fluid in the passage back and forth across the lateral opening for inhibiting access of the mainstream from the inlet to the outlet, and means to discontinue selectively the reciprocation of the control stream so that full flow of the mainstream to and through the outlet may occur.

More particularly the fluidic valve device comprises a control passage including nozzles opposing each other in axial alignment across an interspace, a mainstream outlet opening into the interspace through a diffuser, and communications connecting a mainstream inlet with the control passage at locations disposed symmetrically to either side of the interspace which communications are permanently open but include means effective to restrict flow in the direction towards the inlet, there being also a means as already mentioned to reciprocate a control stream of fluid in the passage, and hence alternately from one nozzle to the other across the interspace, so that the mainstream is isolated substantially not only from the outlet but also from the control passage by virtue of control stream back pressure built up at the flow restricting means.

BRIEF DESCRIPTION OF THE DRAWINGS

The invention will be further described by way of example with reference to the fluidic valve devices shown diagrammatically in the accompanying drawings wherein FIG. 1 shown one such device in schematic form

DETAILED DESCRIPTION OF THE PREFERRED EMBODIMENT

Figure 1:
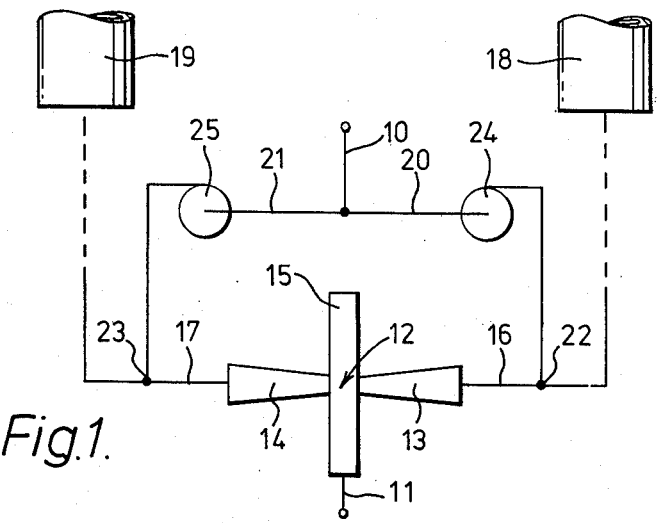

In both Figures, an inlet 10 is adapted to receive a confined mainstream flow of a liquid; an outlet 11 is for discharge of the mainstream when the valve device is in the open state.

A central feature of the device is a modulator indicated generally 12 which comprises two conical diffusers 13 and 14 converging respectively into opposed nozzles (visible only in FIG. 2) which are axially aligned across an interspace. Opening into and encircling this interspace is a radial diffuser within a circular casing 15, the outlet 11 being connected to this radial diffuser.

The conical diffusers 13 and 14 are disposed in series with respective flow connections 16 and 17 to form a substantially linear control stream passage forming a confined control stream intersecting the mainstream. The control stream passage at its ends is connected respectively to control liquid reservoirs 18 and 19, these taking the form in the present example of cylinders. In these cylinders a free surface of a control liquid can be exposed to gas under pressure. By alternately pressurising the cylinders the control liquid is caused to reciprocate in the control stream passage constituted by the connection 16, diffusers 13 and 14 and the connection 17, the control liquid pressures at the diffuser nozzles to either side of the radial diffuser 15 being sufficiently unequal for flow to proceed from the one nozzle to the other with virtually no escape through the radial diffuser to the outlet 11.

Branches 20 and 21 of the mainstream inlet are in permanently open communication with the control stream passage at the intersecting locations 22 and 23 respectively, these locations being situated symmetrically to either side of the radial diffuser 15 to ensure that as and when mainstream flow can reach this diffuser it does so with substantially equal pressure from both directions. In each branch there is a flow restrictor which is effective to restrict flow in the direction towards the mainstream inlet so that the control stream flow may build up back pressure at these restrictors and so be confined to the control stream passage. A simple orifice resistor may serve adequately for such a flow restrictor, in other words, a device which is restrictive in the direction away from the inlet as well as towards it. However it will generally be preferred that the resistance is less in the direction downstream from the inlet. Hence, in the example of FIG. 1, there is a fluidic diode 24 in the branch 20 and an identical fluidic diode 25 in the branch 21. An alternative to the type of diode illustrated, that in which a thin cylindrical chamber has an axial inlet passage and a tangential outlet passage, is a design of axial diffuser presenting greater resistance to flow in one direction than in the other. In FIG. 2, where the main modification is the inclusion of axial diffusers 26 and 27 in place of the diodes 24 and 25 respectively, it will be seen that conical diffusing sections 28 and 29 of these diffusers diverge in the downstream direction relative to the mainstream inlet 10 so that the greater resistance to flow is in the opposite direction.

The fluidic valve device is in its closed state when the cylinders 18 and 19 are alternately pressurised to maintain a flow in the control stream passage 16, 13, 14, 17 which is only interrupted to the extent that on completion of each phase of cylinder pressurisation a reversal of flow direction must take place. The reciprocation frequency is typically several seconds per cycle. Whilst this reciprocating control stream is maintained, back pressure developed at the diodes 22, 23 or the diffusers 26, 27 holds back mainstream flow and there is substantially no escape of the control stream flow through the radial diffuser 15 to the outlet 11 on account of the properties of the modulator 12. In effect the mainstream is therefore shut off.

To achieve the open state, the reciprocation of the control stream liquid is discontinued by stopping the alternate pressurisation of the cylinders 18 and 19. Residual but balanced pressures are required in these cylinders to inhibit ingress of mainstream liquid and may be conveniently established by trapping volumes of the pressurising gas in the cylinders to act as buffers. In the absence of control stream flow, and the back pressures which this flow builds up in the branches 20, 21, the mainstream now flows equally to both sides of the modulator 12. In the modulator the divided mainstream flow is recombined in the nozzle interspace and forced out through the radial diffuser 15 whereby mainstream flow therefore proceeds to and through the outlet 11.

As regards constructional features, FIG. 2 shows a preferred form of the modulator 12. Opposing nozzles are the terminations of the conical diffusers 13, 14 and they merge with smoothly radiussed curvature into the faces of flanges 30 and 31 which are held separated by a narrow gap acting as the radial diffuser. Rebates at the outer margins of the flanges form with an encircling cover a plenum 32 of a shape similar to a toroid into which the outlet 11 is connected. The radial diffuser should present an entry area which is at least substantially equal to the sum of the areas of the nozzle throats. Another feature in FIG. 2 is that the branching of the mainstream inlet is in a Y configuration as indicated at 33, the passages making this configuration being divergent away from the junction. It should be noted however, that the Y joint 33 and the diffusers 26, 27 are possible alternatives and are not necessarily present in combination.

A planar construction of the device, at least for certain applications, may be feasible in which all the various components, to the possible exclusion of the reservoirs or cylinders for reciprocating the control stream, are integrated into a laminar unit preferably made up by a channelled block with a cover plate to close the channels. For this type of construction the radial diffuser 15 in the modulator 12 is replaced by a passage which diverges away from a T junction with the control stream passage.

Figure 2:
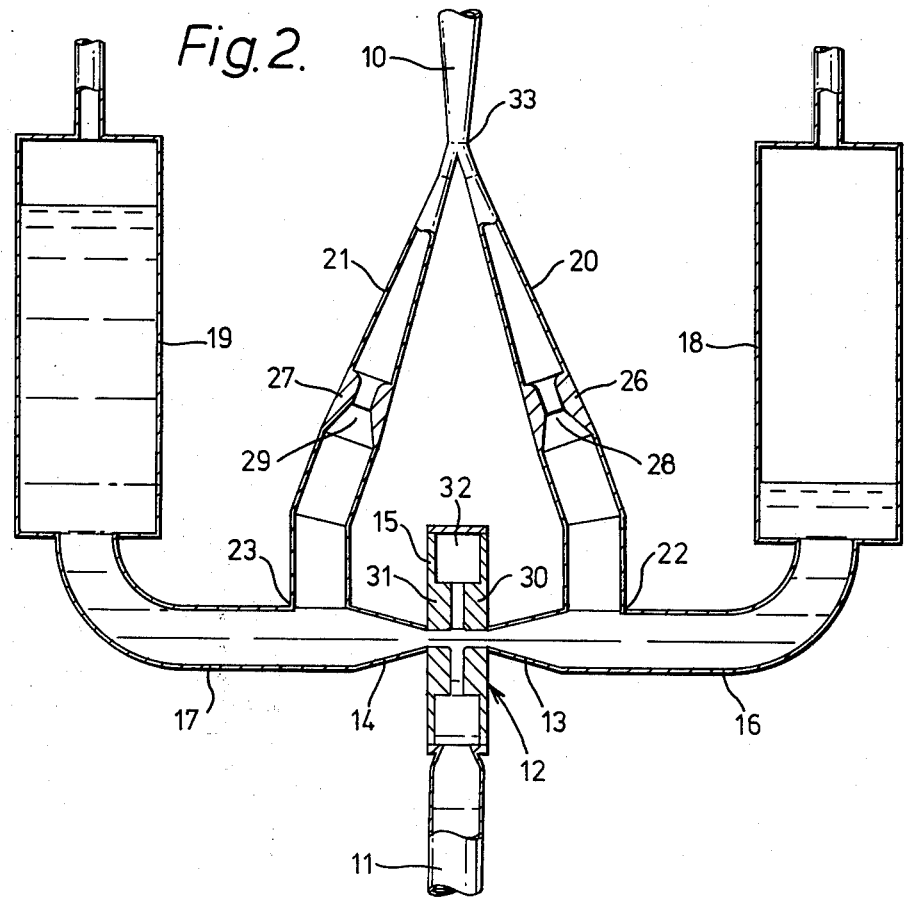
FIG. 2 shows in outline section a modification of the device of FIG. 1.

An alternative to the examples shown in FIGS. 1 and 2 may use a branching of the mainstream outlet instead of branching of the inlet. The symmetrical arrangement is maintained by having two modulators, as at 12, in the control stream passage, to each of which the mainstream outlet is connected by branches, and a single connection of the inlet to the control stream passage at a location midway between the two modulators. A higher pressure may be called for to achieve the shut off effect compared with the illustrated examples but in this case the control stream flow would be lower.

It will generally be of convenience for the fluid of the control stream to be the same as that of the mainstream. A more dense control stream fluid will diminish the control stream flow requirement but the gain in practice from the diminution may be outweighed by disadvantages.

I claim:

1. A fluidic arrester device for arresting a mainstream flow of fluid, such device comprising a control stream passage, a mainstream passage including an inlet, modulator means, and a mainstream outlet in permanently open communication with the control stream passage, said control stream passage intersecting said mainstream passage upstream of said modulator means, said mainstream passage having multiple branches providing intersection of the control stream passage at at least two locations disposed symmetrically to either side of the mainstream modulator means, means to reciprocate a control stream of fluid in said control stream passage back and forth substantially uninterruptedly across the modulator means to block the mainstream from the outlet for inhibiting access of the mainstream from the mainstream inlet to the mainstream outlet, and means to discontinue selectively the reciprocation of the control stream so that full flow of the mainstream to and through the mainstream outlet may occur.

2. The fluidic arrester device of claim 1 wherein said modulator means includes an interspace, the outlet being connected to the interspace.

3. The fluidic arrester device of claim 2 wherein the interspace is encircled by and opens into a radial diffuser to which the outlet is connected.

4. The fluidic arrester device of claim 1 wherein is provided restrictive means within said branches to restrict flow in the direction towards said inlet.

5. A fluidic arrester device for arresting a mainstream flow of fluid, such device comprising a control stream passage, a mainstream passage including an inlet, modulator means, and a mainstream outlet in permanently open and intersecting communication with the control stream passage, two nozzles included in the control stream passage and opposing each other in axial alignment across an interspace at said modulating means, a mainstream outlet in permanently open communication with the interspace, a diffuser between said interspace and said outlet, the mainstream inlet being branched to form two branches opening into the control passage at spaced locations disposed symmetrically to either side of the interspace, restrictive means in each of the branches to restrict flow in the direction towards the inlet, and means to reciprocate a control stream of fluid in the control passage, and hence alternately from one nozzle to the other across the interspace, so that the mainstream is isolated substantially not only from the outlet but also from the control passage by virtue of control stream back pressure built up at the flow restricting means.

6. The fluidic arrester device of claim 5 wherein each of the restrictive means is a fluidic diode arranged to oppose flow in the direction against inlet flow.

7. The fluidic arrester device of claim 5 wherein each of the restrictive means is a diffuser diverging in the direction of inlet flow.

* * * * *